US010347286B2

(12) United States Patent
Tammisalo et al.

(10) Patent No.: US 10,347,286 B2
(45) Date of Patent: Jul. 9, 2019

(54) DISPLAYING SESSION AUDIT LOGS

(71) Applicant: SSH Communications Security OYJ, Helsinki (FI)

(72) Inventors: Toni Tammisalo, Helsinki (FI); Tatu J Ylonen, Espoo (FI)

(73) Assignee: SSH Communications Security OYJ, Helsinki (FI)

( * ) Notice: Subject to any disclaimer, the term of this patent is extended or adjusted under 35 U.S.C. 154(b) by 1105 days.

(21) Appl. No.: 14/339,527

(22) Filed: Jul. 24, 2014

(65) Prior Publication Data

US 2015/0030313 A1    Jan. 29, 2015

Related U.S. Application Data

(60) Provisional application No. 61/858,197, filed on Jul. 25, 2013.

(51) Int. Cl.
| | | |
|---|---|---|
| *G11B 27/02* | (2006.01) | |
| *G06F 17/30* | (2006.01) | |
| *G06F 11/32* | (2006.01) | |
| *H04L 29/06* | (2006.01) | |
| *H04N 21/442* | (2011.01) | |
| *G06F 11/34* | (2006.01) | |

(52) U.S. Cl.
CPC ............ *G11B 27/02* (2013.01); *G06F 11/323* (2013.01); *G06F 17/3061* (2013.01); *H04L 63/20* (2013.01); *G06F 11/3476* (2013.01); *H04N 21/44213* (2013.01)

(58) Field of Classification Search
USPC ........................................................ 726/28
See application file for complete search history.

(56) References Cited

U.S. PATENT DOCUMENTS

| | | | | |
|---|---|---|---|---|
| 4,491,879 | A * | 1/1985 | Fine ....................... | G11B 27/02 360/13 |
| 5,887,063 | A | 3/1999 | Varadharajan et al. | |
| 6,118,821 | A * | 9/2000 | Matsumoto ............ | G10L 19/00 375/240.25 |
| 6,301,661 | B1 | 10/2001 | Shambroom | |
| 8,204,861 | B2 * | 6/2012 | Sondhi ................... | G06Q 10/00 707/648 |
| 9,094,615 | B2 * | 7/2015 | Aman .................... | G01S 3/7864 |
| 9,460,300 | B1 * | 10/2016 | Kissner ................. | G06F 21/606 |

(Continued)

FOREIGN PATENT DOCUMENTS

| | | |
|---|---|---|
| WO | 2013009621 A1 | 1/2013 |
| WO | 2013/093209 A1 | 6/2013 |

OTHER PUBLICATIONS

Supplementary European Search Report of EP Application No. 12859641, dated Aug. 14, 2015.

(Continued)

*Primary Examiner* — Farid Homayounmehr
*Assistant Examiner* — Thanh T Le
(74) *Attorney, Agent, or Firm* — Banner & Witcoff, Ltd.

(57) ABSTRACT

Methods and apparatus for generation of session audit log displays are disclosed. Audit log data is captured in association with at least one session in a computerized system. A video presentation is generated based on the captured audio log data. A video presentation of at least a part of the at least one session can then be displayed based on the generated data.

27 Claims, 9 Drawing Sheets

(56) References Cited

U.S. PATENT DOCUMENTS

| | | | |
|---|---|---|---|
| 2003/0151663 A1* | 8/2003 | Lorenzetti | H04N 7/18 348/148 |
| 2004/0267668 A1* | 12/2004 | Aissi | G06F 21/60 705/50 |
| 2005/0138426 A1* | 6/2005 | Styslinger | H04L 63/0281 726/4 |
| 2006/0174323 A1* | 8/2006 | Brown | H04L 63/0428 726/3 |
| 2006/0206922 A1 | 9/2006 | Johnson et al. | |
| 2006/0227992 A1* | 10/2006 | Rathus | G06F 21/60 382/100 |
| 2006/0236096 A1 | 10/2006 | Pelton et al. | |
| 2006/0259950 A1 | 11/2006 | Mattsson | |
| 2007/0061460 A1* | 3/2007 | Khan | H04L 41/00 709/225 |
| 2007/0118735 A1 | 5/2007 | Cherrington | |
| 2007/0124386 A1* | 5/2007 | Klassen | H04L 51/04 709/206 |
| 2007/0136814 A1* | 6/2007 | Lee | G06F 21/552 726/25 |
| 2007/0168678 A1* | 7/2007 | Meenakshisundaram | G06F 12/1483 713/189 |
| 2007/0179945 A1* | 8/2007 | Marston | G06Q 10/107 |
| 2007/0300306 A1* | 12/2007 | Hussain | G06F 21/6218 726/27 |
| 2008/0163337 A1* | 7/2008 | Tuliani | H04L 63/0245 726/2 |
| 2008/0222416 A1 | 9/2008 | Kiwimagi et al. | |
| 2008/0304805 A1* | 12/2008 | Baharav | G11B 27/034 386/248 |
| 2010/0262545 A1* | 10/2010 | Herlitz | G06Q 10/00 705/51 |
| 2010/0322251 A1* | 12/2010 | Li | H04L 12/467 370/395.53 |
| 2011/0185055 A1 | 7/2011 | Nappier et al. | |
| 2011/0252459 A1 | 10/2011 | Walsh et al. | |
| 2012/0096524 A1* | 4/2012 | Kovalan | G06F 19/321 726/5 |
| 2012/0102373 A1* | 4/2012 | Waugh | G06F 11/0769 714/57 |
| 2012/0131057 A1* | 5/2012 | Youn | G06F 21/6227 707/781 |
| 2012/0143634 A1* | 6/2012 | Beyda | G06Q 10/06 705/4 |
| 2012/0185936 A1* | 7/2012 | Lakshminarayanan | G06F 21/52 726/22 |
| 2012/0221949 A1* | 8/2012 | Olsa | G06F 11/3476 715/704 |
| 2012/0311448 A1* | 12/2012 | Achour | G06Q 10/101 715/723 |
| 2012/0324584 A1* | 12/2012 | Al-Shaykh | H04N 7/163 726/26 |
| 2013/0081112 A1* | 3/2013 | Kelly | H04L 9/3271 726/4 |
| 2013/0111561 A1 | 5/2013 | Kaushik | |
| 2013/0191631 A1* | 7/2013 | Ylonen | H04L 63/1483 713/153 |
| 2014/0282087 A1* | 9/2014 | Cioni | H04L 65/80 715/753 |
| 2014/0317409 A1* | 10/2014 | Bartok | H04L 63/06 713/171 |

OTHER PUBLICATIONS

XP-002342178, Applied Cryptography, Second Edition, Passage, Jan. 1, 1996, Applied Cryptography: Protocols, Algorithms and Source Code in C, John Wiley & Sons, New York, pp. 56-59.

Singaporean Search Report of Application No. 11201403482T dated Sep. 4, 2015, 4 pages.

Singaporean Written Opinion of Application No. 11201403482T, dated Sep. 10, 2015, 5 pages.

Product Review: ObserveIT Remote Access Auditor by Chris Sanders, Published Aug. 19, 2010, 8 pages.

"An SSH Key Management System: Easing the pain of Managing Key/User/Account Associations", International Conference on Computing in High Energy and Nuclear Physics, Journal of Physics: Conference Series 119, IOP Publishing, 2008. (pp. 1-6).

EP Search Report of Application No. 14175776.5-1870, dated Nov. 13, 2014.

Non-Final Office Action of U.S. Appl. No. 14/319,319, dated Sep. 23, 2015.

* cited by examiner

DISPLAYING SESSION AUDIT LOGS

CROSS-REFERENCE TO RELATED APPLICATIONS

This application claims priority under 35 U.S.C. § 119 to U.S. Provisional Application Ser. No. 61/858,197, filed Jul. 25, 2013, the disclosure of which is incorporated herein by reference.

FIELD OF THE INVENTION

This disclosure relates to management operations in a computerized system, and more particularly to presentation of audit logs, for example for access auditing purposes.

BACKGROUND

A typical computerized system is accessed by various users. When a user accesses the system with his/hers terminal device access related data and more particularly access log data is typically generated. The access log data can be presented e.g. for analysis and audit purposes. The capability of presenting the access logs to authorized users is considered important e.g. for security and/or operational reasons.

Users of computer systems can have differing levels of user rights. For example, a majority of users in an organization may only have rights to perform operations and access resources that relate to specific roles and tasks without any rights to make alterations to the settings and configurations of the system and its components. On the other hand, users with administrator rights can be allowed to make even considerable changes to the system. At least some level of control on activities of such users can be provided by means of access auditing. A common way to do this is to deploy specific auditing tools for privileged access auditing. The purpose of these tools is often to provide visibility into what system administrators do when they obtain access to a computer system, for example, for performing administrative operations.

Some privileged access auditing systems log commands executed with elevated privileges in a system log, from which they can be obtained. For example, certain privileged access auditing systems provide Java™-based applications for downloading and displaying session logs to a user (e.g., security administrator) who needs to view them. Some other privileged access auditing systems use a Windows™ based applications that download session logs and enable viewing the logs. Examples of commercial privileged access management systems include products sold under trade names CyberArk PIM, Xceedium, and BalaBit SCB.

However, these approaches require having special software installed on the terminal, typically a personal computer such as desktop, laptop or the like in order to provide a facility to view the logs. Viewing of the logs may also be quite difficult and require assistance from a security professional to extract the required information from logs. Security of some of the older software applications has been questioned and there may be resistance in installing these in the personal computers. Installing of a special application may also be quite difficult in practice in many cases.

SUMMARY

In accordance with an aspect there is provided a method comprising obtaining audit log data captured in association with at least one session in a computerized system, generating data for a video presentation based on the captured audio log data, and causing display of the video presentation of at least a part of the at least one session based on the generated data.

In accordance with an aspect there is provided an apparatus for a computerized system comprising at least one processor, and at least one memory including computer program code, wherein the at least one memory and the computer program code are configured, with the at least one processor, to cause the apparatus to receive audit log data captured in association with at least one session in the computerized system, generate data for a video presentation based on the captured audio log data, and cause display of the video presentation of at least a part of the at least one session based on the generated data.

In accordance with an aspect there is provided a non-transitory computer readable media, comprising program code for causing a processor to perform instructions for a method comprising: obtaining audit log data captured in association with at least one session in a computerized system, generating data for a video presentation based on the captured audio log data, and causing display of the video presentation of at least a part of the at least one session based on the generated data.

In accordance with another aspect there is provided a method comprising receiving a request for a video representation of a session, reading audit log data captured for the session from a storage, extracting content associated with the session, processing the extracted content through an emulator to produce frame images indicative of events during the session to generate a video stream, and causing the video stream to be displayed by a user interface of the requestor.

Certain more detailed aspects are evident from the detailed description.

SUMMARY OF THE DRAWINGS

Various exemplifying embodiments of the invention are illustrated by the attached drawings. Steps and elements may be reordered, omitted, and combined to form new embodiments, and any step indicated as performed may be caused to be performed by another device or module.

DETAILED DESCRIPTION

Certain embodiments relating to privileged access auditing of use of a computer system are described in the following to illustrate the invention. Audit log data obtained from the system can be used to generate data that is in a format enabling presentation of a video. In certain embodiments audit logs can be displayed as videos in a web-based user interface. In certain embodiments the audio log data is processed to produce frame images indicative of events during the session to generate a video stream. For example, the frame images can be indicative of the display the audited user saw and/or action(s) performed by the audited user. In the following more particular examples of creation of data for video presentations are given with reference to the accompanying Figures.

Figure 1:
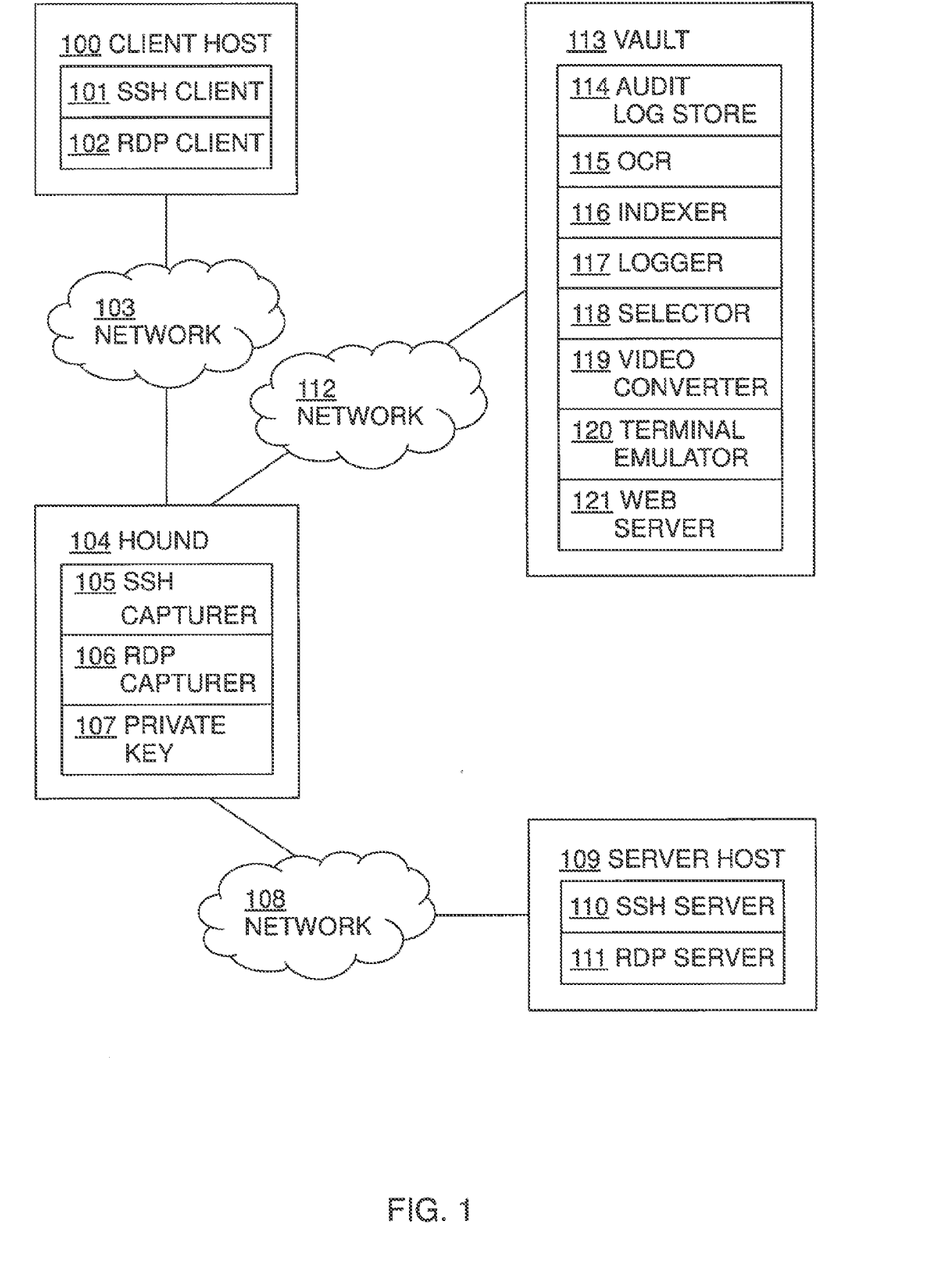
FIG. 1 illustrates a network setup for transparent capture of network traffic.

FIG. 1 illustrates an example of network environment and connected data processing devices for performing transparent capture of session audit log data for a session. The environment includes a client host 100 that initiates a network connection using a network protocol. The network protocol is advantageously a secure session protocol such as Secure Shell (SSH) protocol, Remote Desktop (RDP) protocol, Virtual Network Computing (VNC) protocol, PC-over-IP (PCoIP) protocol, Secure Hypertext Transport Protocol (HTTPS), or another protocol used for performing operations on a computer over a network. The client host includes a protocol client, for example an SSH client 101 or an RDP client 102. Such protocol clients may display data and otherwise interact with a user, or may be driven by scripts or automated processes to perform automatic operations on a data processing device over a network.

The client host communicates over a network 103 through a hound entity 104 and a second network 108 with a server host 109 to which the client host connects using the secure session protocol. It is noted that some or all of the networks mentioned herein may also be provided by a lesser or greater number of networks, or even by single network. The server host may include a protocol server, such as an SSH server 110 or an RDP server 111.

The hound 104 can be provided by a data processing device configured to capture network connections going through it. In the embodiment of FIG. 1, the client host 100 makes a connection to the network address of the server host 109. The hound entity 104 is situated so that communications from the client host to the server host are routed through the hound. The Internet Protocol (IP) is used for the communication. The IP can be provided advantageously in the form of the Transmission Control Protocol (TCP). The hound includes a protocol capturer, such as an SSH capturer 105 or RDP capturer 106.

In an embodiment, the hound can capture the content of encrypted connections. Such capture may utilize a private key 107 to perform a man-in-the-middle attack on an encrypted connection. The encrypted connection can be for example based on the SSH Transport Layer Protocol or the Secure Socket Layer (SSL) or Transport Layer Security (TLS) protocol used in RDP.

In an embodiment, a key management system is used for obtaining a copy of a private key used on a server host into the hound. The key management system may utilize an agent program installed on the server host for fetching the private key and sending it over a secure network protocol to the hound device where it is stored. According to a possibility the hound device may make a connection to an agent program on the server host (or some other host that can use the relevant private key) and use the agent program to perform an operation using the private key to transparently perform the man-in-the-middle attack.

The hound 104 communicates over a network 112 with a vault entity 113. The vault is configured to store session audit data. The hound entity may also be configured to assist in making policy decisions such as what sessions to audit and what connections to permit. The hound may also distribute configuration data to one or more vaults. The vault and hounds may be in a known fault-tolerant configuration such that if one node goes down, another will take over.

A device providing the vault may comprise various components. An audit log store 114 can be provided for storing session audit logs for one or more sessions. A session audit log may store all or part of the content transmitted using a session, advantageously with timestamps indicating when each piece of content was transmitted. For example, for an SSH session the data may contain all characters output by the SSH server in terminal channel(s), and may or may not contain copies of transmitted files. A session audit log may also contain characters typed by a user. Advantageously, the session audit logs are stored encrypted. A session audit log is advantageously accompanied by metadata containing information about the session, such as the original client host, the client-side user name (or other authentication information provided), a server-side user name, IP addresses or names of the client host and server host, a provided ticket identifier, time and date, total amount of data transferred, and possibly various tags based on matching criteria against text segments obtained from the session. Information about perplexity (unexpectedness, uncommonality) of that particular user connecting from that client host to that particular server-side account on that particular server may also be provided.

An Optical Character Recognition (OCR) module 115 can be provided for extracting text segments from one or more graphical sessions (such as RDP) captured by a hound.

An indexer 116 can be provided for indexing the text segments obtained from terminal output, OCR, or otherwise for fast searching. Any known method for full text indexing can be used. An example of such is described by one inventor T. Ylonen in: An Algorithm for Full Text Indexing, Master's Thesis, Helsinki University of Technology, Finland, 1992.

A logger 117 can be provided to log information about sessions. For example, the logger can provide log data regarding which user logged in from where to where under what authorization/ticket. The logger can also be configured to log events where sessions match certain criteria, or have high perplexity. The logger can provide data that helps analysis to understand when sessions should be specially inspected or when breaches should be suspected.

A selector 118 may be used by a user for selecting one or more sessions for viewing, possibly including performing keyword searches or searching sessions by their metadata.

To generate data suitable for video presentations a video converter 119 can be provided. The video converter 119 can be configured to convert one or more selected sessions into videos. The data generation may be provided so that search criteria and/or other triggering event(s) is/are highlighted. The video converter may use a terminal emulator 120 or a graphical emulator (e.g., RDP emulator, HTML rendering library) to generate images of the output of the session at various times. These images can be used as video frames which are encoded into a video stream using a suitable video codec. For example, the open source "libtheora" software may be used for encoding the video from the captured data.

A web server 121 may be used for receiving requests from a user. The requests may include e.g., selection of a session, request to display a video and so on. The web server sends responses back to the user, e.g., a list of matching sessions or an HTML page (HyperText Mark-up Language page) causing a video stream for a selected session to be displayed.

Such an HTML page may use, for example, the "video" tag defined in HTML5 to cause a web browser used by a user to fetch the video from the web server and play it back. The video may also be made available for downloading.

Figure 2A:
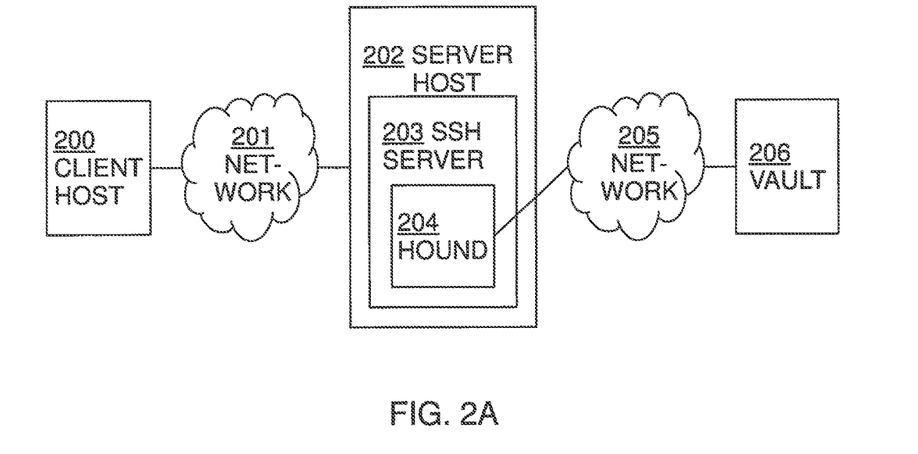
FIGS. 2A and B illustrate certain network setups for capture of network traffic.

FIG. 2A illustrates a system for capturing sessions in a server host when there is no separate hound device in the network. A client host 200 connects over a network 201 to a server host 202 which runs a session protocol server, such as an SSH server 203 with embedded hound functionality 204. The embedded hound connects over a network 205 to a vault 206 for storing session audit logs, and sends a session audit log for the connection to the vault. They vault may also aid in policy decisions, configurations, etc.

The hound and vault advantageously reside in separate network devices such as computers or virtual machines. The hound and vault may also be in the same network device, such as a computer or a virtual machine in which communication between them may be using an application programming interface (API) rather than a network protocol. Both may also reside in the same device where the SSH server is provided.

Figure 2B:
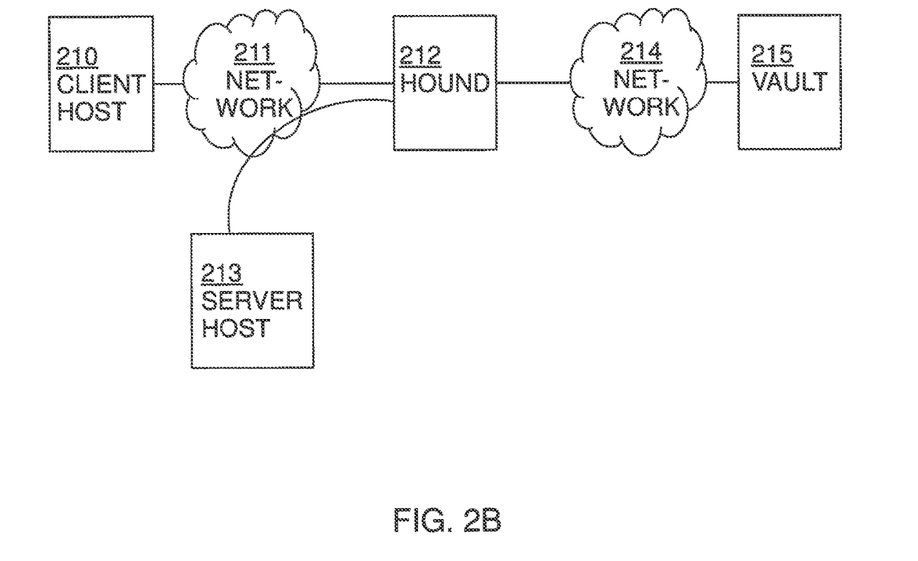

FIG. 2B illustrates a system for capturing sessions using a bastion host. In this scenario, a client host 210 connects over a network 211 to a hound 212 acting as a bastion host using a session protocol. The network address of the bastion host can be used. The bastion host implements a server for the network protocol, connects to a server host 213 using the session protocol, and acts as a hound capturing the content transmitted using the session protocol. In this case, since the client host expects to connect to the hound, there is no need to perform a man-in-the-middle attack on encrypted sessions. Instead, the session can be terminated at the bastion host and a new connection made to the server host. The server host name and user name on the server host may be indicated in the session protocol connection from the client, for example, as part of the destination user name provided when connecting to the bastion host. The bastion host communicates over a network 214 with a vault 215 to send session audit logs. The bastion host may also receive policy, configurations, etc.

Figure 3:
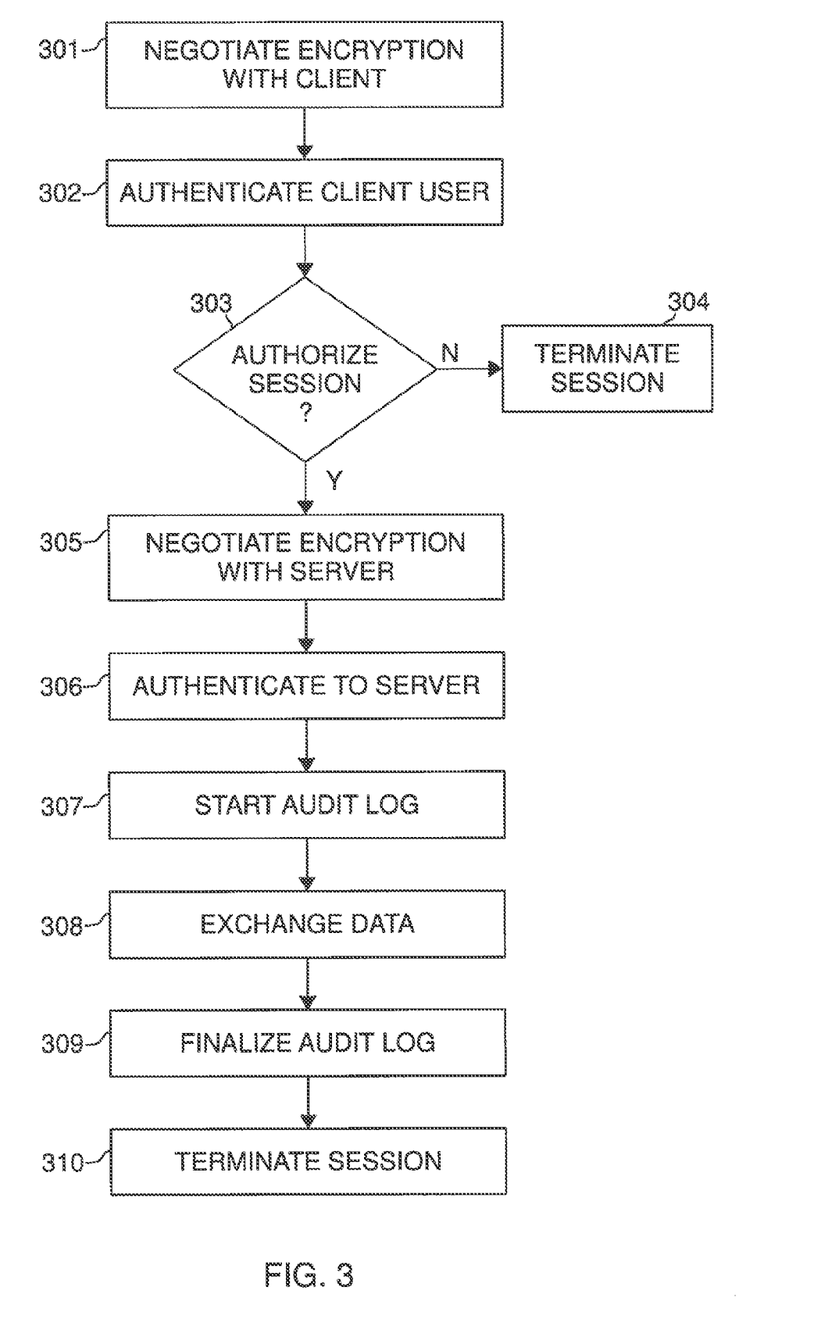
FIG. 3 illustrates processing for capturing a session.

FIG. 3 illustrates capturing an encrypted session. The capturing would typically take place in a hound. First, encryption is negotiated with a client 301. This is possible for example based on use of a private key of a server host to make the client believe it is communicating with the server host. The client user is then authenticated 302. The authentication can be provided for example against Active Directory, Kerberos, LDAP (Lightweight Directory Access Protocol) directory, using a password, token, or some other authenticator. A check is then made on whether the session is to be authorized 303. If not, the session is terminated 304.

If the session is to be authorized, then encryption is negotiated with a server host 305, the session is authenticated to the server 306, and logging session audit data to a vault is started 307. Data is then exchanged between a client host and a server host, logging some or all of the content of the session to the hound 308. Logging of the session is finalized 309 and the session is terminated 310.

When authenticating a session to the server host, a hound may send a copy of the authentication credentials it received from the client host to the server host. Alternatively, or in addition, it may, e.g., obtain a new Active Directory or Kerberos ticket for itself for the session and use that to authenticate to the server host. Authentication credentials for the server host may also be fetched from a suitable source, such as a password vault, as needed. This may be desirable especially in case the access is to a privileged account that the user that was authenticated cannot directly access. Authentication may also be using a private key held by a hound and configured as an authorized key on the server.

Figure 4:
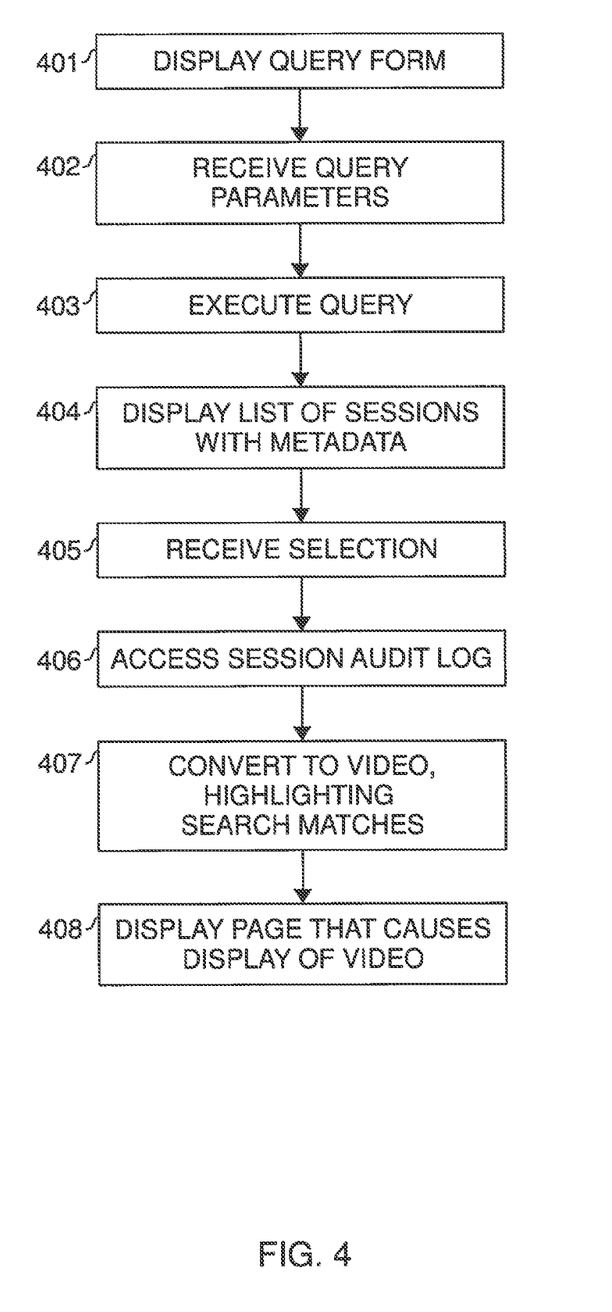
FIG. 4 illustrates processing for selecting a session for display.

FIG. 4 illustrates selecting a session for display. A query form is displayed to a user 401 (e.g., as a web page). Query parameters are then received from the user (e.g., as an HTTP request) 402 and the query is executed by a server 403. A result list based on session metadata is displayed 404. Results may be filtered based on permissions granted to the person making the query. A selection of a session is received from a user 405 and the session audit log for the session is accessed and decrypted as necessary 406. The session audit log is converted to a video 407. In an embodiment, one or more session audit logs are pre-converted to video before a request to view them, possibly soon after the session has been captured. Matching search criteria may be highlighted in the video or bookmarks or other markers may be added in the video for such matches. The video is then displayed to the user 408. For example, a web page containing an HTML5 video tag that causes the video to be displayed may be communicated to appropriate terminal.

Figure 5:
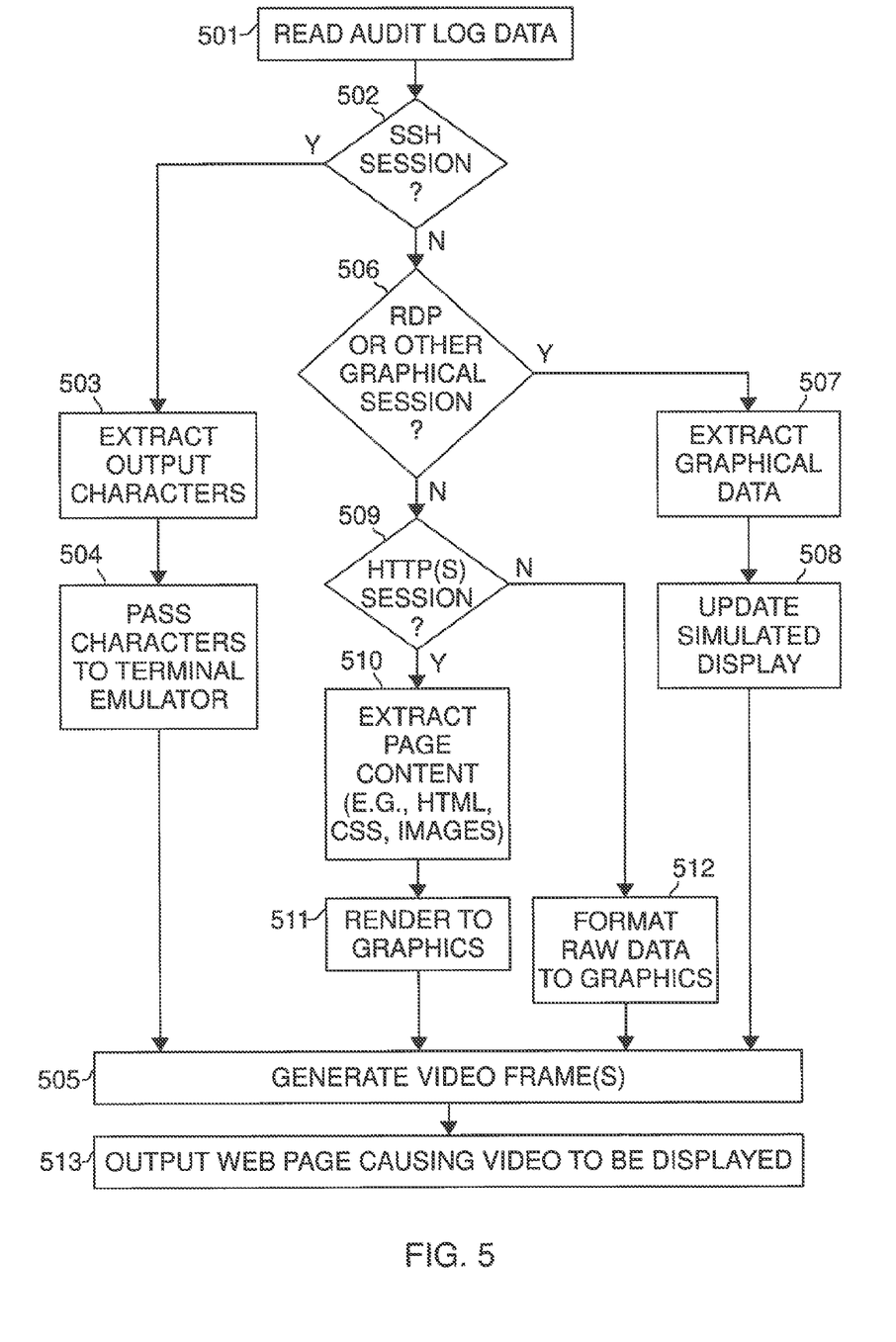
FIG. 5 illustrates a method for converting audit log data for an interactive session to a video and outputting a web page for causing the video to be displayed in a web browser.

FIG. 5 illustrates converting audit log data to video and causing display based on the converted data. The audit log data and/or its metadata is accessed and decrypted as needed 501. In the example, if the session is an SSH session 502, then one or more characters of session output data can be read from the session 503. The character(s) is/are passed to a terminal emulator 504. Video frames are generated based on the current display as determined/output by the terminal emulator 505 and this is repeated until the session or determined sections of interest from it have been processed 506. Search terms of interest may be highlighted as the video is generated, for example, by determining the location of the terminal emulator cursor before sending a search term to the terminal emulator, sending the search term to the emulator, and then determining the cursor, and changing the colors of the region between the cursor locations. The background color may also be changed before sending the search term to the terminal emulator. The whole row containing the search term(s) may be highlighted.

The video may also be made to contain sound effects for key presses or when a point of interest (e.g., search term) is approaching, mouse clicks (these can be marked using audio or visually in the frame image). Cursor movement for graphical sessions can also be shown on the video.

If the session is not an SSH session, then a check is made as to whether it is another type of session. In the example it is checked if the session is RDP session 506. If so, graphical data is extracted from the session audit log 507, updating a display is simulated (using an RDP output emulator) 508, and one or more video frames are generated and encoded from the simulated display 505. This can be repeated until the session or sections of interest have been processed. Each frame may be processed by OCR, or using previously saved OCR data for the frame, and matched search terms may be highlighted on each frame. This can be provided e.g., by finding search terms and the locations of each character or word from OCR data.

If the session is not an RDP session, a check is made whether it is an HTTP or HTTPS session 509. If so, a web page content and dependent pages/files/objects are extracted from the web page 510 (e.g., HTML, CSS, images, JavaScript), the page is rendered into a graphical display using a web browser engine (e.g., by tools such as KHTML, WebKit, Gecko, Trident, or Presto) 511, and one or more video frames are generated from the graphical output 505. This is repeated for later pages fetched and displayed in the session.

As pages are rendered, possibly after a page has been displayed for some time, form fields for the web page may be filled using data from the next request sent to the same web server, or other web server indicated in a form tag, and the page rendered with the fields having the given values as their values. This may involve e.g. modifying the HTML for the form fields or adding JavaScript to set values for the fields before rendering.

If the session data type cannot be recognized, the raw data may be formatted into graphics 512 and video frames generated and coded from it 505, or the data may be otherwise displayed. Raw data may be shown, e.g., as a hexadecimal dump. This can be provided together with printable characters in ASCII.

Finally, a web page is output and sent to a web browser for causing the browser to display the video 513.

While reading data from session and processing it using an emulator and generating video frames, pauses in the original session may be honored so that data appears in the video at the same rate as it was originally typed/sent. This can be implemented by generating duplicates of the earlier frames until a change should occur. Events such as cursor blinking may be simulated by changing its image at suitable intervals. Alternatively, the video may be compressed by limiting the delay between changes to a configured maximum value (e.g., one second). The speed of the video may also be dynamically adjusted depending, e.g., on proximity to search term matches, so that the video goes fast when there are no matches, but slowly before and after a match.

It is possible to display such a video using user interface technologies other than a web page. For example, the video can be played in a window in an application. Displaying it over the web is believed to be advantageous since it provides a superior user interface for auditors and others who need to watch the videos, without requiring installation of any applications or and software such as Java™ on desktops or other terminals.

Figure 6:
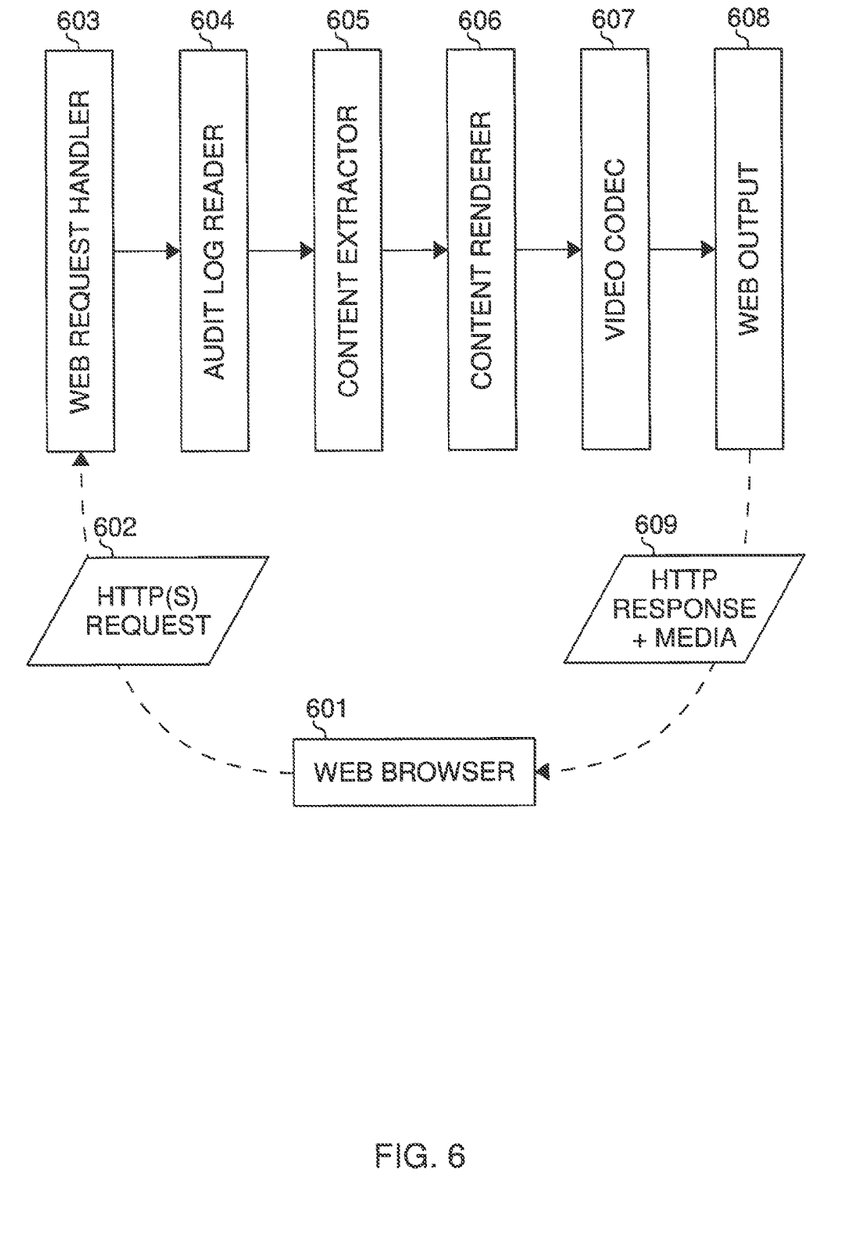
FIG. 6 illustrates viewing audit log for a session.

FIG. 6 illustrates an example of viewing an audit log more from a data flow/module perspective. A user uses a web browser 601 causing it to send an HTTP/HTTPS request 602 to a web request handler 603 (e.g., a web server), which interprets the request and checks the user's permissions to access the requested data. In response to the request, an audit log reader 604 reads (and decrypts, if applicable) the session audit log data, sending it to a content extractor 605 that obtains session content or output from the data, sending the content to a content renderer 606 (e.g., a terminal emulator, RDP emulator, or web browser engine), whose output is taken as video frames and sent to a video codec 607 for encoding into a video stream (e.g., a H.264 or MPEG-4 codec). Also, in response to the request, a response web page 609 is generated 608 (e.g., by the web server) and sent back to the web browser 601, causing the video to be displayed.

The result web page may also contain pictures that can be used for jumping to points of interest in the video. Such pictures may have small captions highlighting why a particular part is interesting, e.g., showing the matched search term(s) or alert(s).

Figure 7:
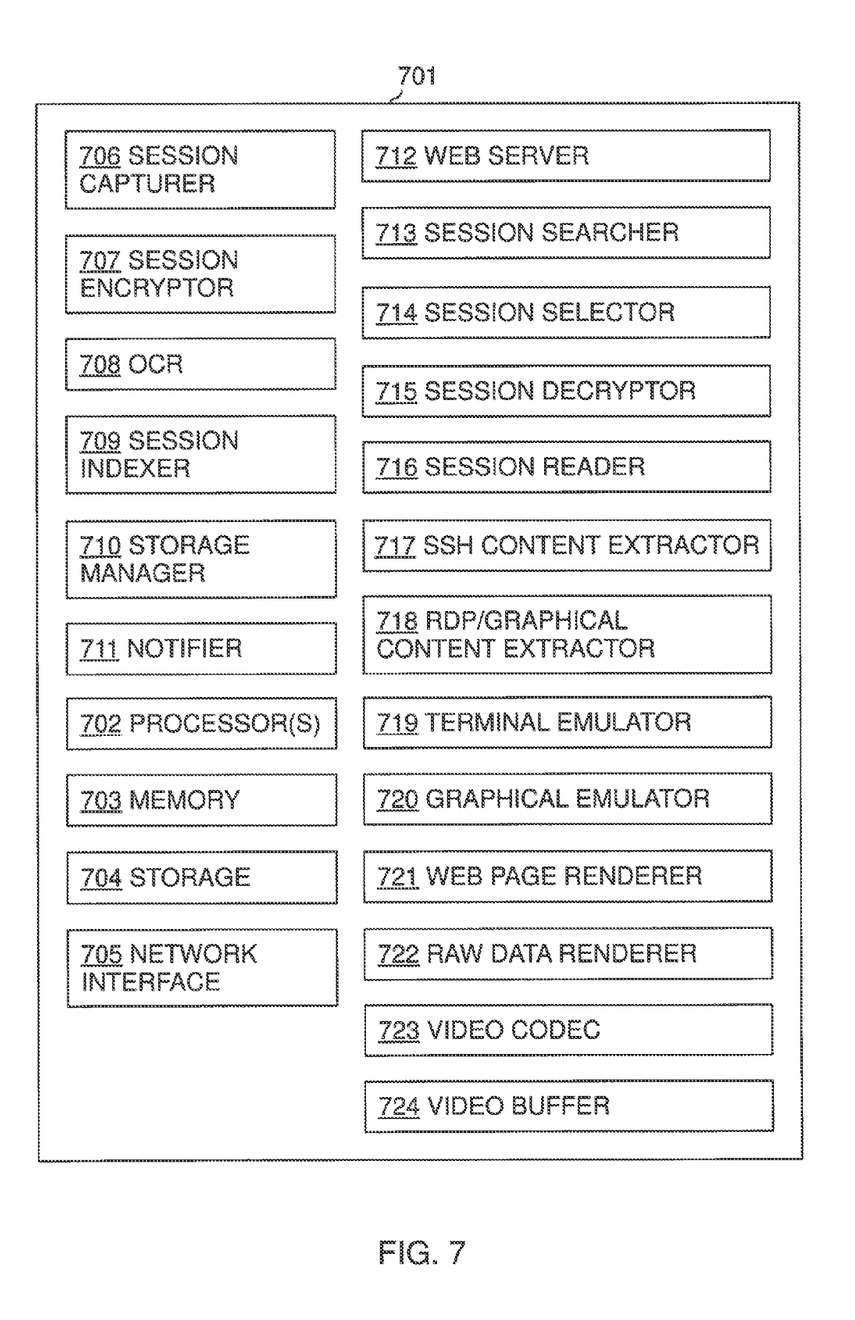
FIG. 7 illustrates a computer system for converting audit log data for an interactive session to a video stream and outputting a web page for causing the video to be displayed in a web browser.

FIG. 7 illustrates an apparatus 701 (e.g., a computer system) for converting a session audit log to a video and viewing it over a web-based user interface. The apparatus comprises one or more processors 702 (e.g., Intel Xeon™ series processors), memory 703 connected to the processors (e.g., SDRAM memory), a storage subsystem 704 connected to the memory and/or processor(s), such as a magnetic disk drive or other non-volatile memory device, and a network interface 705 connected to the memory and/or processor(s) for communicating with other devices over a network. It is noted that in this specification, a device or apparatus may also refer to a virtual machine inside a physical apparatus. The various components may also be divided among multiple devices, and may communicate using APIs or suitable protocols, and may perform actions by causing another device to perform the action, e.g., by sending a suitable protocol message to cause the performing and waiting for a reply indicating completion.

A session capturer 706 captures session audit log data for a session. The capturer can be e.g., in transparent mode, in bastion mode, in a server host as an agent program, or in a protocol server, such as an SSH server. A session encryptor 707 encrypts the captured session audit log data. An OCR module 708 extracts characters from captured session audit log data. The session indexer 709 indexes the characters extracted by the OCR module and content obtained from text-based session or by cleaning HTML pages into an index data structure that can speed up searching. The index may be encrypted to protect confidentiality of session audit log data. The session audit log data and the index are stored using a storage manager 710, which may store the data on local storage 704 or networked storage over a network (e.g., NFS (Network File System) volume, iSCSI device, or cloud-based storage).

A notifier 711 analyzes session metadata and/or the output of OCR or content obtained from a text-based session or cleaned web page(s). The notifier may trigger logging records to syslog or a SIEM (Security Information and Event Management) system. For example, it may match sessions against patterns or regular expressions, and trigger log records whenever a match is encountered. It may also add tags to session metadata, such as flagging certain sessions for future inspection. It may also analyze the metadata to determine how unexpected a particular connection is (i.e., estimating the perplexity of the session); if the session or commands entered in the session are something a user commonly does, it has low perplexity; if it is very uncommon, it has high perplexity. The notifier may also tag sessions based on access to certain critical accounts or access crossing certain predefined security boundaries.

A web server 712 (e.g., an Apache™ web server with Django™ framework for writing web applications in Python™) receives requests from a web browser and either responds to them immediately or uses the framework and additional program code to process a request. It also sends responses, e.g., HTML (HyperText Markup Language) pages and files (e.g., style sheets, images, videos) back to the web browser. A session searcher 713 may be a framework application that provides a web page where a user may enter search criteria for session metadata and content, and in response to receiving a request from the user, performs the search. The search may be performed e.g. using an index created by the session indexer and a database of metadata. The session searcher then generates a response page containing a list of one or more found sessions. The session selector 714 receives a request from a web browser with identification of a session. This can be a reference to the list of found sessions. The session decryptor 715 handles decrypting of a session audit log.

The session reader 716 reads session data; SSH content extractor 717 extracts output from an SSH session; RDP/graphical content extractor 718 extracts graphical data (e.g., requests to redraw a part of the screen) from an RDP or other graphical session; a terminal emulator 719 takes characters and emulates a terminal, generating a frame image of what a terminal window would look like after receiving the characters; a graphical emulator 720 takes a graphical update and generates a frame image of what a graphical window would look like after the update; a web page renderer 721 takes a web page and generates a frame image of what a web page would look like when rendered by a browser. A raw data renderer 722 generates a frame image of uninterpreted data.

The video codec 723 takes one or more frame images from the other components and generates a video from these, with suitable timings. The video is stored in a video buffer 724. The buffer may be, e.g., a file, or the video may be generated on the fly whenever requested. Videos may generally be precomputed. This may happen any time after data for the video has been captured, and even before the session is completed. The videos may be computed on the fly or may be computed and cached for a while whenever needed.

In an embodiment, generating a video for a session begins already before the session is completed. As the session progresses, more frames are added to the video. A request may be made to watch the video for the session before the session is complete. In this case, as more of the video is computed, more of it is sent to the terminal of the user watching the video. Even in this case, the video may be generated in a file or other buffer or it may be generated dynamically when it is requested.

Figure 8:
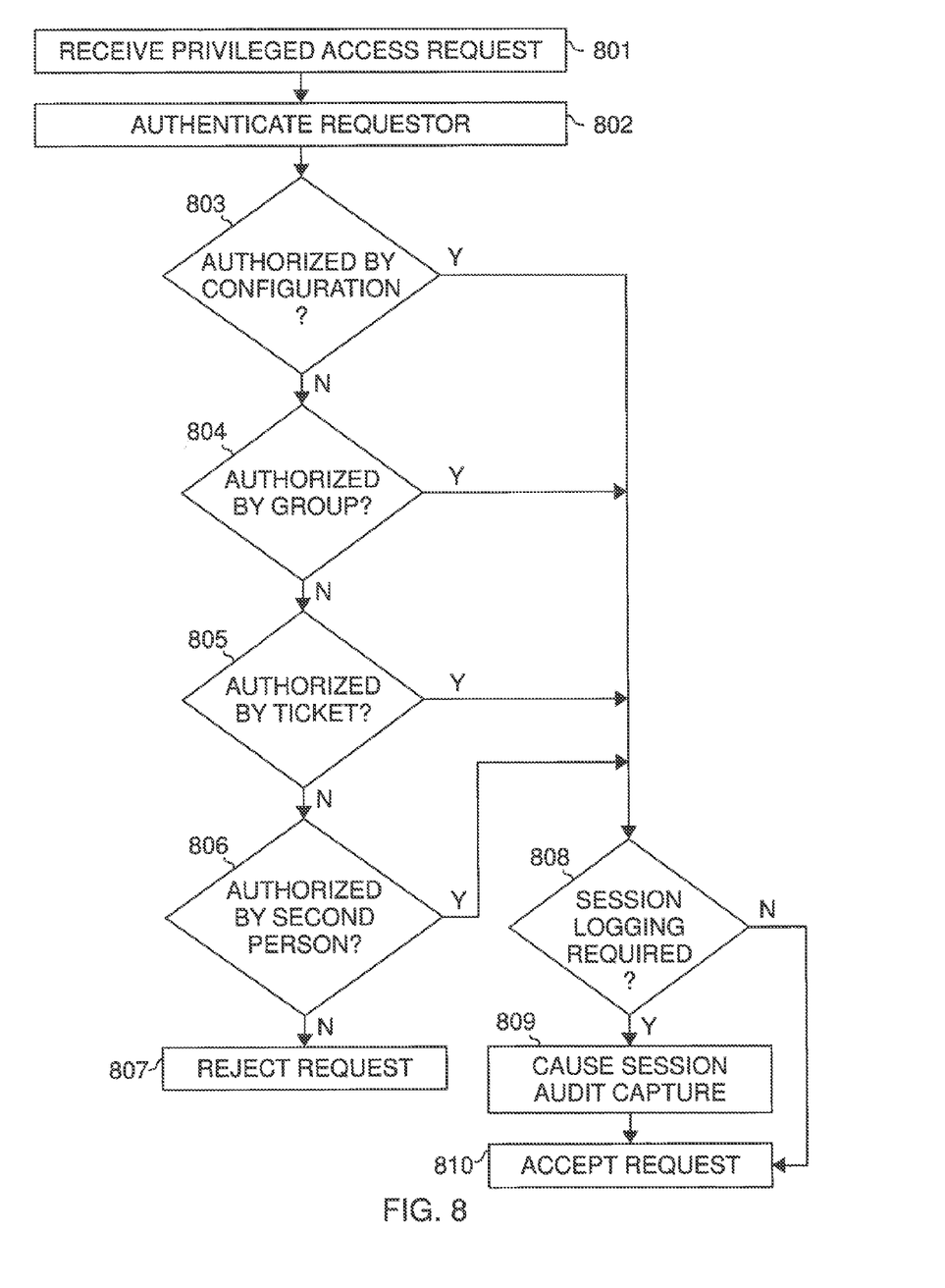
FIG. 8 illustrates a method for deciding whether privileged access is to be allowed.

FIG. 8 illustrates deciding whether to allow privileged access for a session. A request for privileged access is received 801 e.g., via an SSH connection specifying a privileged user name on the server. The requestor (client-side user) is authenticated 802, and it is checked whether general configuration permits the user to access the privileged account 803. Further, it is checked whether a group the user is a member of authorizes connecting to the requested account on the server 804 and whether the user supplied or has (based on a query to a ticketing system) a ticket assigned to the user that authorizes access to the requested account on the server 805. It can also be checked whether access to the account by the user can be authorized by a second person 806 (for four-eyes access). If none applies, the request is rejected 807.

If authorization is granted, it is checked whether session logging is required 808, and if so, the session is caused to be captured in a session audit log 809. The privileged access request is then accepted 810.

Four-eyes access may be implemented by tagging a session as waiting for a person to monitor it, and only letting the session to continue when an authorized person selects the session for viewing. Video for the session may be generated in near real time, letting the monitoring user see what is being in the session. This can take place even if they are not physically co-located. The monitoring user may be provided buttons or other controls to pause and/or terminate the session. Certain commands entered in the session may be suspended until the monitoring person expressly approves them (e.g., by clicking a button, touch screen or mouse). Certain file transfers may be suspended until expressly approved by the monitoring person. Such express approvals may be implemented by including a record indicating need for such approval with the session object, and having the monitoring person's browser regularly check for such requests (e.g., using the Ajax mechanism in JavaScript), and when the request is approved, marking it as such in the record. The hound handling the session would periodically (e.g., once per second) check the record to see if processing can now continue. Chat functionality may also be provided between the monitored user and the monitoring person.

Figure 9:
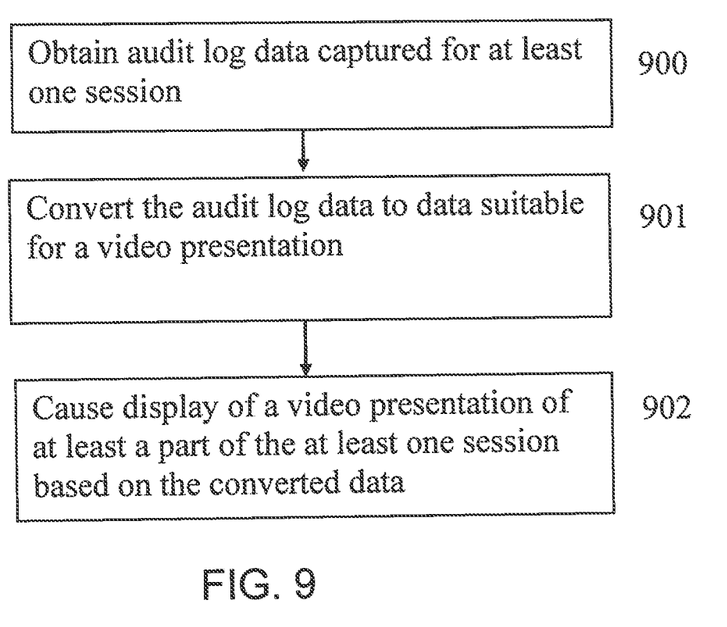
FIG. 9 is a flowchart in accordance with an embodiment.

FIG. 9 illustrates an embodiment where audit log data captured in association with at least one session in a computerized system is obtained at 900. Data for video presentation is generated based on the captured audio log data at 901. A display of a video presentation of at least a part of the at least one session is then caused at 902 based on the generated data. Capture of the audio log data can be provided by a node in the network configured to intercept and/or decrypt data associated with the session, the node being separate from a user terminal used for access to resources in the computerized system during the session.

The various embodiments and their combinations or subdivisions may be implemented as methods, apparatuses, or computer program products. They may also be provided as methods for downloading computer program code for performing the same. Computer program products may be stored on non-transitory computer-readable media, such as DVD, magnetic disk, or semiconductor memory. Method steps may be implemented using instructions operable to cause a computer to perform the method steps using a processor and a memory. The instructions may be stored on any computer-readable media, such as memory or non-volatile storage.

The foregoing description provides by way of exemplary and non-limiting examples a full and informative description of exemplary embodiments of the s invention. However, various modifications and adaptations may become apparent to those skilled in the relevant arts in view of the foregoing description, when read in conjunction with the accompanying drawings and the appended claims. All such and similar modifications of the teachings of this invention will still fall within the spirit and scope of this invention.

What is claimed is:

1. A method comprising:
    capturing, by an intermediate data processing device comprising a data capture entity, content of encrypted network connections between client hosts and server hosts in a network system to obtain audit log data in association with at least one session in a computerized system,
    generating data for a video presentation based on the audit log data, and
    causing display of the video presentation of at least a part of the at least one session based on the generated data.

2. The method of claim 1, comprising selecting a session from a plurality of sessions.

3. The method of claim 1, comprising highlighting search terms used for finding or selecting a session for the video presentation.

4. The method of claim 1, comprising timing the video presentation according to timing of events taking place in the at least one session.

5. The method of claim 1, comprising compressing periods of inactivity in the video presentation.

6. The method of claim 1, comprising causing presentation of duplicates of earlier video frames during periods of inactivity in the video presentation.

7. The method of claim 1, comprising obtaining audit log data for at least one of a Secure Shell (SSH) session, a Remote Desktop (RDP) session and an encrypted session protocol session.

8. The method of claim 1, comprising causing display of a web page incorporating the video presentation.

9. The method of claim 1, comprising capturing the audit log data by capturing data associated with an encrypted protocol session where a graphical protocol is used for generating displays, and causing reproduction of the displays as a video presentation based on the generated data.

10. The method of claim 1, comprising processing graphical data by Optical Character Recognition (OCR) to extract one or more text segments from at least one display and/or indexing text segments from one or more captured sessions for fast searching.

11. The method of claim 1, comprising capturing the audit log data by a man-in-the middle attack or by a bastion host.

12. The method of claim 1, comprising
decrypting the audit log data based on at least one key from a database.

13. The method of claim 1, wherein the audit log data is stored in a searchable data store.

14. The method of claim 1, wherein the audit log data for a session comprises at least one of
at least a portion of content associated with the at least one session,
a timestamp when a particular portion of content associated with the at least one session was transmitted,
characters input by a user in association with the at least one session,
metadata about the at least one session, and
information about a perplexity of the at least one session.

15. The method of claim 1, comprising generating the video presentation by generating images of displays during the at least one session based on the audit log data and encoding the generated images as video frames into a video stream.

16. A method comprising:
receiving a request from a requestor for a video presentation of at least a part of a session between a client host and a server host in a network system,
reading from a storage audit log data captured for the session by an intermediate data processing device located between the client host and the server host and comprising a data capture entity for capturing content of encrypted network connections between client hosts and server hosts,
extracting content associated with the session,
processing the extracted content through an emulator to produce frame images indicative of events during the session to generate a video stream, and
causing the video stream to be displayed by a user interface of the requestor.

17. A method according to claim 16, comprising generating sound and/or visual effects that coincide user actions during the session and/or points of interest in the video presentation.

18. A method according to claim 16, comprising initiating generation of the video presentation during the session.

19. An apparatus for a computerized system comprising at least one processor, and at least one memory including computer program code, wherein the at least one memory and the computer program code are configured, with the at least one processor, to cause the apparatus to
receive audit log data captured in association with at least one session between a client host and a server host in the computerized system, the audit log data being captured by an intermediate data processing device located between the client host and the server host and comprising a data capture entity for capturing content of encrypted network connections between client hosts and server hosts,
generate data for a video presentation based on the captured audit log data, and
cause display of the video presentation of at least a part of the at least one session based on the generated data.

20. The apparatus of claim 19, configured further to at least one of
time the video presentation according to timing of events taking place in the at least one session,
compress periods of inactivity in the video presentation,
cause presentation of duplicates of earlier video frames during periods of inactivity in the video presentation,
cause display of a web page incorporating the video presentation,
generate sound and/or visual effects that coincide user actions during the at least one session,
generate sound and/or visual effects that coincide with points of interest in the video presentation, and
initiate generation of the video presentation during the at least one session.

21. The apparatus of claim 19, wherein the audit log data is captured from an encrypted protocol session where a graphical protocol is used for generating displays, the apparatus being configured to reproduce the displays as a video presentation based on the generated data.

22. The apparatus of claim 19, wherein the data capture entity is configured to provide a man-in-the middle attack or a bastion host to capture the audit log data.

23. The apparatus of claim 19, configured to capture encrypted data and decrypt the captured data based on at least one key obtained from a database.

24. The apparatus of claim 19, comprising a searchable data store for storage of said captured audit log data.

25. The apparatus of claim 19, configured to generate the video presentation based on generation of images of displays during the at least one session based on the captured audit log data and encoding of the generated images as video frames into a video stream.

26. The apparatus of claim 19, configured to
receive a request from a requestor for the video presentation associated with the at least one session,
read the audit log data captured for the at least one session from a storage,
process information extracted from the audit log data through an emulator to produce at least one frame image indicative of events during the at least one session to generate a video stream, and
cause the video stream to be displayed by a user interface of the requestor.

27. A non-transitory computer readable media, comprising program code for causing a processor to perform instructions for a method comprising:
obtaining audit log data captured in association with at least one session between a client host and a server host in a computerized network system, the audit log data being captured by an intermediate data processing device located between the client host and the server host and comprising a data capture entity for capturing content of encrypted network connections between client hosts and server hosts,
generating data for a video presentation based on the captured audit log data, and
causing display of the video presentation of at least a part of the at least one session based on the generated data.

* * * * *

UNITED STATES PATENT AND TRADEMARK OFFICE
CERTIFICATE OF CORRECTION

PATENT NO.       : 10,347,286 B2
APPLICATION NO.  : 14/339527
DATED            : July 9, 2019
INVENTOR(S)      : Tammisalo et al.

Page 1 of 1

It is certified that error appears in the above-identified patent and that said Letters Patent is hereby corrected as shown below:

In the Claims

On Column 11, Line 11:
In Claim 12, after "comprising", delete "¶"

On Column 11, Line 17:
In Claim 14, after "of", insert --:--

On Column 11, Line 57:
In Claim 19, after "the apparatus to", insert --:--

On Column 12, Line 4:
In Claim 20, after "of", insert --:--

On Column 12, Line 39:
In Claim 26, after "to", insert --:--

Signed and Sealed this
Twenty-fourth Day of September, 2019

Andrei Iancu
*Director of the United States Patent and Trademark Office*